United States Patent [19]
Bissonnette

[11] Patent Number: 5,120,026
[45] Date of Patent: Jun. 9, 1992

[54] FLUID COOLED CUTTING TORCH FOR OPERATION WITH A PREMIX AND POSTMIX NOZZLE

[76] Inventor: Claude Bissonnette, 232 11th Street West, Cornwall, Ontario, Canada, K6H 3B2

[21] Appl. No.: 613,275

[22] Filed: Nov. 14, 1990

[51] Int. Cl.⁵ .............................................. B23K 7/00
[52] U.S. Cl. ......................................... 266/48; 266/77
[58] Field of Search ........................... 266/48, 51, 77; 239/132.1, 132.3, 128

[56] References Cited

U.S. PATENT DOCUMENTS 1,288,879  12/1918  Harris ................................... 266/48
4,443,003  4/1984   Bleys .................................... 266/48

Primary Examiner—S. Kastler
Attorney, Agent, or Firm—Andrus, Sceales, Starke & Sawall

[57] ABSTRACT

A fluid cooled cutting torch includes a hollow handle, a torch butt assembly, a torch head, supply tubes for preheat gas, preheat oxygen and cutting oxygen and cooling fluid supply and drainage conduits. The torch head is adapted to interchangeably receive a premix or postmix cutting torch nozzle. The cooling supply conduit extends through the torch butt assembly and within the torch handle to a point adjacent the torch head. The cooling system provides effective cooling of the torch head and even cooling of the torch handle. The torch is easily manufactured at low cost. The torch may be readily converted from a premix torch to a postmix torch.

7 Claims, 2 Drawing Sheets

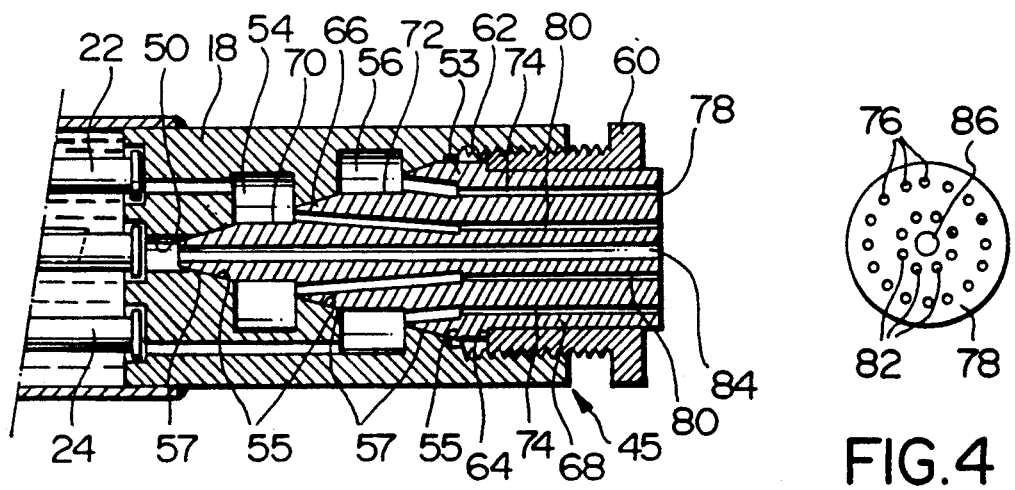
FIG. 3
FIG. 4
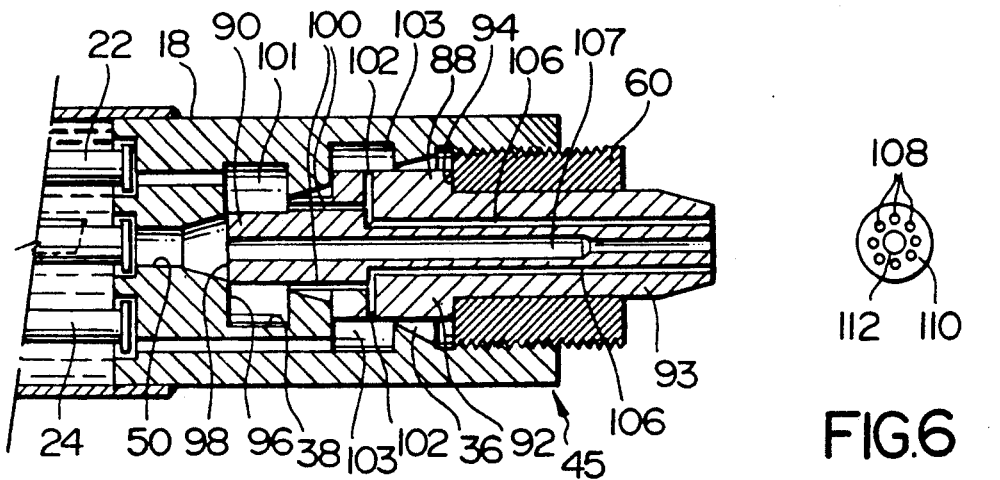
FIG. 5
FIG. 6
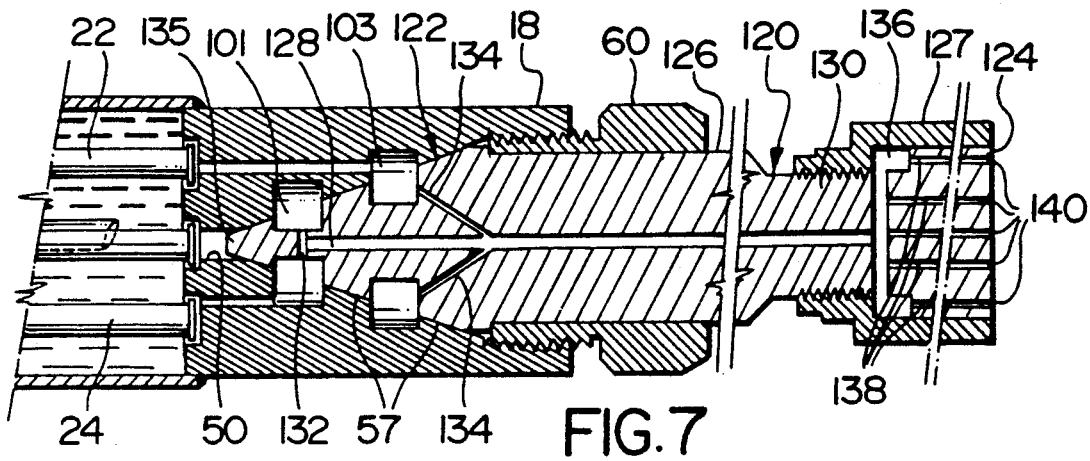
FIG. 7

FLUID COOLED CUTTING TORCH FOR OPERATION WITH A PREMIX AND POSTMIX NOZZLE

The present invention relates to cutting torches and in particular to a fluid cooled cutting torch for use with either a premix or a postmix nozzle.

BACKGROUND OF THE INVENTION

Cutting torches are generally used for cutting metal by locally heating the metal to its oxygen ignition temperature with a preheat flame powered by an oxygen/fuel gas mixture and subsequently cutting the metal with a high velocity cutting oxygen stream supplied by the torch. The preheated metal is oxidized by the cutting oxygen, thereby releasing a considerable amount of thermal energy which further heats the surrounding metal. The high velocity oxygen stream physically removes the molten material by oxidation, thereby cutting the metal. Mixing a preheat fuel gas such as acetylene, propane, natural gas, etc., with preheat oxygen gas for preheat combustion may be accomplished either internally or externally of the torch. In the first case, mixing of the preheat gases occurs in a premix torch nozzle and in the second case the preheat gases are mixed by turbulence in the gas stream after exiting a postmix nozzle.

Larger flames may be achieved with postmix nozzles. Postmix nozzles are usually employed in industrial processes for cutting slab steel and the like. Thermal energy radiated from the preheat flame and the molten metal causes heating of a cutting torch, interfering with the handling of the torch and promoting the adhesion of molten cutting metal to the torch tip, sometimes blocking the gas exit openings in the nozzle and increasing the potential for flashbacks and other hazards. Therefore, cooling of cutting torches is desirable for improving their handling and performance and to increase their service life.

Water cooling systems for welding or cutting torches are known from Rehrig (U.S. Pat. No. 4,508,951) and published British patent application GB 2,189,670 by Musker. The Rehrig cooling system includes an annular cooling water conduit, which extends longitudinally of the torch body and is longitudinally separated into two equal chambers. The cooling water enters one of these chambers at the rear end of the torch, flows to the torch head where it enters the other chamber and exits that other chamber at the rear end of the torch. One disadvantage of this cooling arrangement is that the water is heated before it reaches the torch head, resulting in insufficient cooling of the torch head, the hottest part of the torch. Furthermore, since the inlet and outlet for cooling fluid are diametrically opposed on the torch butt, the torch body is unevenly cooled. This can result in uneven and inadequate cooling and possible damage to the torch due to thermal stress and potential warping.

In the cooling system taught by Musker, cooling water is directed through a plurality of passageways extending longitudinally in a cylindrical jacket of the torch body. The cooling water enters these passageways in one half of the jacket at the rear end of the torch body, flows through these passageways towards the head, and subsequently flows rearward from the head through the passageways in the other half of the jacket to the rear end of the torch body where it exits the torch. It is a disadvantage of such a water cooled torch that the water flow in the passageways will be of different velocity which leads to uneven cooling of the torch. It is a further disadvantage that the construction of the jacket is time consuming and involves costly manufacturing techniques. Furthermore, the cooling of the torch head is insufficient and the cooling of the torch body is uneven for the reasons discussed in relation to the cooling system taught by Rehrig.

The cooling efficiency of such a multi passageway system and the cooling of the torch head, may be improved by dividing the cylindrical jacket into two separate cooling jackets, which are each individually supplied with cooling water. However, in such a cooling system, uneven and unsatisfactory cooling of the torch still results and the cooling system becomes even more difficult and costly to manufacture.

These problems are overcome by the present invention which provides a cooling system for a fluid cooled cutting torch that effectively cools the torch head and evenly cools the torch handle or body, while being easily manufactured at low cost. Furthermore, prior art fluid cooled cutting torches are not adapted for use interchangeably with premix and postmix nozzles. The torch of the present invention may be readily converted from a premix torch to a postmix torch and vice versa. The torch of the present invention may further be used with a premix heating nozzle for heating purposes only.

SUMMARY OF THE INVENTION

Accordingly, the present invention provides a fluid cooled cutting torch for use as a premix or postmix cutting torch, comprising a torch handle which has a front end and a rear end and a passageway which extends from the front end to the rear end; a torch head connected to the front end of the handle; a torch butt assembly connected to the rear end of the handle and first, second and third supply tubes each supplying one of preheat gas, preheat oxygen and cutting oxygen to the torch head. The torch further includes a cooling fluid supply conduit for supplying cooling fluid into the passageway and a cooling fluid drainage conduit for removing of cooling fluid from the passageway. The coolant conduits pierce the torch butt assembly. The torch head has a nozzle seat chamber for interchangeably receiving one of a premix and postmix cutting torch nozzle. The nozzle chamber includes first and second radial gas distribution grooves which are in fluid communication with the first and second supply tubes respectively and distribute preheat gas and preheat oxygen to the torch nozzle. The nozzle chamber further includes an axial bore in fluid communication with the third supply tube for supplying cutting oxygen to the nozzle.

In a further adaptation of the torch in accordance with the invention, the torch nozzle chamber removably receives a premix heating nozzle for conversion of the fluid cooled cutting torch to a fluid cooled heating torch.

The cooling fluid supply conduit preferably extends through the passageway so that a discharge end of the conduit is adjacent a rear end of the head and the cooling fluid entering the passageway directly impinges on the rear end of the head. In a preferred embodiment, the supply tubes and cooling fluid conduits extend through the passageway without contacting any part of the handle. In another preferred embodiment, the cooling fluid supply conduit discharge end is obliquely cut for increasing the discharge angle of the cooling fluid exiting the discharge end. The torch head and the torch butt assembly are preferably rigidly affixed to the torch handle by soldering. A plurality of cooling fluid supply conduits may extend into the handle to adjacent the head for an increased supply of cooling fluid per unit time. The cooling fluid used is preferably water or air but may be any other appropriate liquid or gas. The pressure of the cooling fluid in the torch handle is preferably higher than the pressure of any of the gases in the gas supply tubes so that, upon accidental damage to any of the tubes within the torch handle, the fuel and cutting gases may not enter into and mix within the torch handle.

It is an object of the present invention to provide an improved, evenly cooled cutting torch.

It is a further object of the present invention to provide a fluid cooled cutting torch adapted for use with premix and postmix cutting nozzles as well as a premix heating nozzle.

It is another object of the present invention to provide a fluid cooled cutting torch which is economical to manufacture.

It is yet another object of the present invention to provide a fluid cooled cutting torch which may be readily converted from a premix type cutting torch to a postmix type cutting torch or a premix type heating torch and vice versa.

BRIEF DESCRIPTION OF THE DRAWINGS

The invention will now be further explained by way of example only and with reference to the following drawings, wherein:

FIG. 3 illustrates a postmix nozzle installed on the cutting torch shown in FIG. 1;

FIG. 4 is a front end view of the nozzle shown in FIG. 3;

FIG. 5 illustrates a premix nozzle installed on the cutting torch shown in FIG. 1;

FIG. 6 is a front end view of the nozzle shown in FIG. 5; and

FIG. 7 illustrates a premix heating nozzle installed on the cutting torch shown in FIG. 1.

DESCRIPTION OF THE PREFERRED EMBODIMENT

Figure 1:
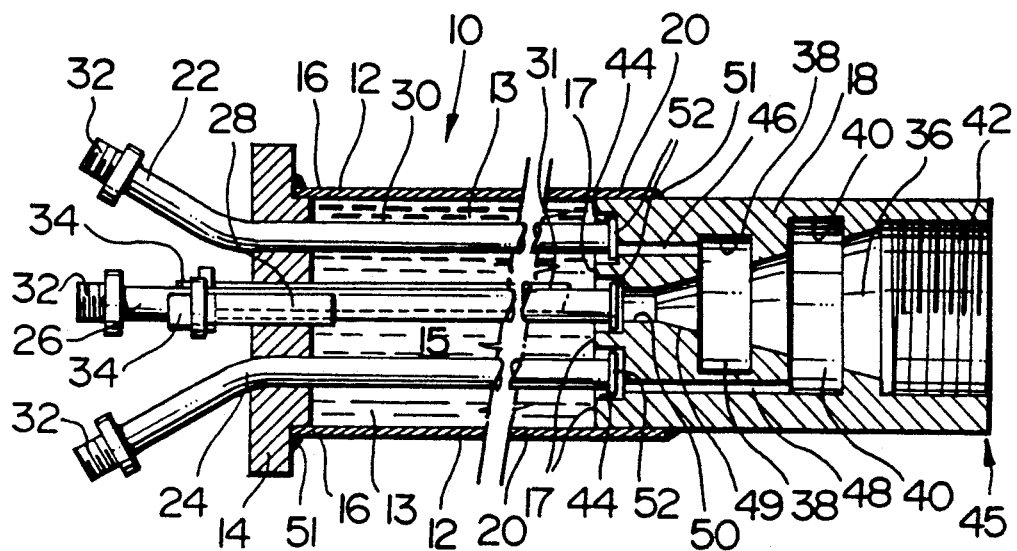
FIG. 1 is an axial cross-section of a fluid cooled cutting torch in accordance with the invention.
Figure 2:
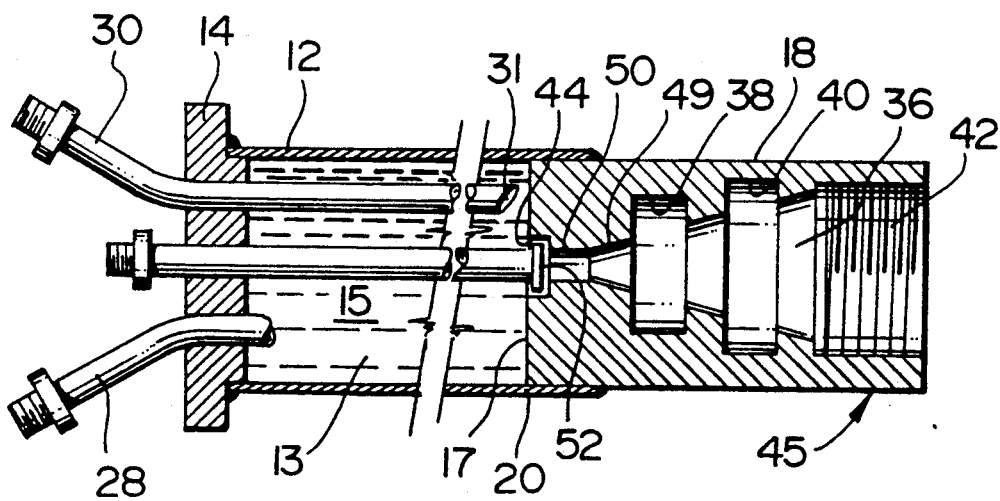
FIG. 2 is an axial cross-section of the cutting torch shown in FIG. 1, the sectional plane being rotated by 90°.

As shown in FIG. 1, a preferred embodiment of a fluid cooled cutting torch in accordance with the invention, hereinafter generally referred to by reference numeral 10, includes a cylindrical torch handle 12, a torch butt assembly 14 affixed to a rear end 16 of handle 12 and a torch head 18 secured to a front end 20 of handle 12. A first supply tube 22 for supplying one of preheat fuel gas and preheat oxygen, a second supply tube 24 for supplying one of preheat oxygen and preheat fuel gas and a third supply tube 26 for supplying cutting oxygen pierce torch butt assembly 14 and extend through a passageway 13 of handle 12 to head 18. A cooling fluid supply conduit 30 (see FIG. 2) and a cooling fluid drainage conduit 28 pierce the torch butt assembly 14 and are in fluid communication with passageway 13. As shown in FIG. 2, cooling fluid supply conduit 30 extends through passageway 13 to a rear end surface 17 of head 18. Therefore, cooling fluid 15 exiting a discharge end 31 of conduit 30 directly impinges on the rear end surface 17 of the torch head 18, resulting in a very effective cooling of the head 18, which is the part of torch 10 most subject to heat stress. Subsequently, cooling fluid 15 flows rearwardly through passageway 13 of handle 12 providing even cooling of the handle 12 and supply tubes 22, 24 and 26 before exiting through the cooling fluid drainage conduit 28. Due to the effective cooling of the torch head 18 and the handle 12, damage to torch 10 due to warping is substantially prevented. Cooling fluid supply conduit 30 preferably extends through the passageway 13 without contacting any part of handle 12 so that the cooling fluid flowing through supply conduit 30 is not heated before contacting the torch head and cooling of the head 18 is maximized. Supply tubes 22, 24 and 26 are connected with appropriate pressurized gas and oxygen supplies (not illustrated) through gas supply hoses having screw couplings or some other appropriate in-line gas connector known in the art. Cooling fluid conduits 28 and 30 are connected with a cooling fluid pump or a pressurized cooling fluid supply such as a pressurized cooling fluid storage vessel or a water supply and may be provided with appropriate pressure control valves for regulating the pressure of the cooling fluid therein. Cooling fluid 15 is preferably water or air, but it will be readily apparent to a person skilled in the art that other non-corrosive and non-explosive liquids and gases may be used.

As shown in FIG. 2, head 18 includes a nozzle seat 36 of substantially frusto-conical shape. The diameter of nozzle seat 36 increases towards a front end 45 of head 18. Nozzle seat chamber 36 includes two spaced apart radial gas distribution grooves 38 and 40 which communicate with first and second supply tubes 22 and 24 respectively through axial bores 46 and 48 of head 18 (see FIG. 1). A tapered rear end 49 of nozzle seat chamber 36 communicates with third supply tube 26 through a co-axial bore 50 in head 18.

Torch head 18 further includes, at a front end, a threaded connector 42 for securing a premix or a postmix cutting torch nozzle. It will be apparent to an art skilled person that the threaded connector may be provided by an internal thread as shown in FIG. 1 or an external thread (not illustrated), or a combination of both for securing a torch nozzle to the head in a manner described in detail below. Head 18 is recessed into front end 20 of handle 12 and is rigidly affixed thereto by soldering. The solder used is preferably a silver solder which contains at least 45% silver to provide a solder joint 51 (see FIG. 1) with a good heat resistance. Rear surface 17 of the torch head 18 is provided with counter bores 44 for receiving end flanges 52 on the front ends of supply tubes 22, 24 and 26. Sealing material (not illustrated) is provided between end flanges 52 and counter bores 44 to prevent the preheat and cutting gases from accumulating in passageway 13 of handle 12 and to prevent leakage of cooling fluid into the torch head. Torch butt assembly 14 is recessed into the rear end 16 of handle 12 and is also rigidly affixed thereto with a silver solder joint. Solder joints 51 (see FIG. 1) extend continuously around handle 12 to provide a reliable and complete seal between torch butt assembly 14 and handle 12 as well as head 18 and handle 12.

Turning now to FIG. 2, cooling fluid supply conduit 30 extends through torch butt assembly 14 and within passageway 13, without contacting the handle, to a point adjacent rear end surface 17 of head 18. The discharge end 31 of cooling fluid supply conduit 30 is preferably cut obliquely so that the cooling fluid exits the conduit at a wide angle. The cooling fluid flow rate and the distance between the end of supply conduit 30 and head 18 should be selected so that the cooling fluid directly impinges on rear surface 17 of head 18. Cooling fluid 15 subsequently flows rearwardly until it exits the passageway 13 through cooling fluid drainage conduit 28. Cooling fluid drainage conduit 28 preferably has a cross-sectional area which is at least as large as the cross-sectional area of cooling fluid supply conduit 30 in order to facilitate the removal of heated cooling fluid from the torch. It will be readily apparent to a person skilled in the art that a plurality of cooling fluid supply and drainage conduits may be provided in order to increase the cooling fluid through-put of the torch.

Turning now to FIG. 3, a postmix nozzle 53 which includes a substantially conical end section 66 and a substantially cylindrical front section 68 is inserted into head 18. Postmix nozzle 53 is removably held in head 18 by a retaining nut 60, a rear surface 62 of which engages an annular shoulder 64 on front section 68 of postmix nozzle 53 to force the nozzle into sealing engagement with the complementary frusto-conical wall 57 of the nozzle seat chamber 36 (see FIG. 2). An annular preheat fuel gas chamber 54 is defined by radial fuel gas distribution groove 38 of head 18 and a first annular recess 70 of triangular cross-section in nozzle end section 66. An annular preheat oxygen chamber 56 is defined by radial oxygen distribution groove 40 and a second annular recess 72 of triangular cross-section in nozzle end section 66. A plurality of preheat oxygen delivery channels 74 and fuel gas delivery channels 80 in postmix nozzle 53 communicate with preheat oxygen chamber 56 and preheat fuel gas chamber 54 respectively and extend axially through postmix nozzle 53 to a corresponding number of preheat oxygen discharge openings 76 and preheat gas discharge openings 82 in front face 78 of nozzle 53 (see FIG. 4). The inner diameter of delivery channels 74 and 80 may change towards front face 78. A central cutting oxygen channel 84 in postmix nozzle 53 communicates with co-axial bore 50 of head 18 and extends axially through nozzle 53 to a central cutting oxygen discharge opening 86 in front face 78. Thus, in the postmix torch illustrated in FIG. 3, preheat fuel gas and preheat oxygen, supplied through first and second supply tubes 22 and 24 respectively, exit postmix nozzle 53 and mix, externally of postmix nozzle 53, to combust in a preheat flame used for heating a metal to be cut. Once a metal has been heated to its molten temperature by the preheat flame, cutting oxygen supplied through the cutting oxygen stream discharged from central oxygen discharge opening 86 oxidizes and removes the molten material, thus cutting the metal. Delivery channels 74 may be parallel to channels 80 but generally extend through nozzle 53 at a more or less acute angle to channels 80 in order to achieve mixing of the preheat oxygen and preheat gas at a selected distance from the front face 78 of the nozzle. The sealing engagement between the conical sections of nozzle 53 and the corresponding conical sections of nozzle seat 36 prevents a mixing of the preheat gases within postmix nozzle 53. Postmix nozzle 53 directly contacts head 18 along most of its surface which provides for an effective transfer of thermal energy from nozzle 53 to head 18 and, thus, efficient cooling of the nozzle. An EPOCK 300 postmix nozzle is preferably used as postmix nozzle 53. It will be apparent to a person skilled in the art, that other appropriate postmix nozzles may be employed in combination with the torch in accordance with the invention, as long as mixing of any of the gases within the torch and nozzle is reliably prevented.

As shown in FIG. 5, a premix nozzle 88 is inserted into head 18 and removably held therein by retaining nut 60. Premix nozzle 88 is substantially cylindrical and includes an end portion 90 and a front portion 92 of larger diameter. Retaining nut 60 is screwed into head 18 and engages a shoulder 94 of front portion 92 for forcing nozzle 88 onto nozzle seat 36 and against a rear wall 96 of annular distribution groove 38 of head 18 for sealing engagement of a rear surface 98 of nozzle 88 and rear wall 96. A plurality of first axial bores 100 communicate with an annular preheat oxygen distribution chamber 101 and a corresponding number of radial bores 102 which in turn communicate with an annular preheat fuel gas distribution chamber 103. Radial bores 102 also communicate with a corresponding number of second axial bores 106 which extend through nozzle 88 to preheat fuel gas discharge openings 108 in front face 110 of nozzle 88 (see FIG. 6). Thus, in contrast to the arrangement of the gas supply lines when the torch is used as a postmix torch, described in reference to FIG. 3, preheat fuel gas is, in the premix torch configuration, supplied through second supply tube 24 to the second annular distribution chamber 103 located towards the front end of head 18 and preheat oxygen is supplied through first supply tube 22 to the first annular distribution chamber 101 adjacent the rear end of head 18. Therefore, preheat oxygen and preheat fuel gas enter nozzle 88 through first axial and radial bores 100 and 102 respectively and are mixed in second axial bores 106 to a preheat fuel mix before exiting discharge openings 108 for fuelling a preheat flame. An axial cutting oxygen bore 107 in premix nozzle 88 communicates with bore 50 of head 18 and extends through premix nozzle 88 to a cutting oxygen discharge opening 112 in front face 110 of the premix nozzle. In this context it must be noted that premix nozzles allow the use of acetylene as preheat gas which will not burn properly in a postmix torch, thereby further improving the versatility of a fluid cooled cutting torch in accordance with the invention. Premix nozzles of other shapes and cross-sections may be employed as long as it is guaranteed that the preheat gases do not mix with the cutting oxygen within the torch and nozzle, the preheat gases do not exit the torch and nozzle except through preheat gas discharge openings 108 and the cutting oxygen it supplied, is only discharged through central discharge opening 112. Therefore, a postmix cutting torch as shown in FIG. 3 may be converted to a premix cutting torch as shown in FIG. 5 by replacing postmix nozzle 53 with a premix nozzle 88 and reversing the connection of the first and second supply tubes 22 and 24 to their respective gas and oxygen supply hoses. The resulting premix torch may be converted back to a postmix torch by reversing this conversion procedure.

FIG. 7 shows a premix heating nozzle 120 which is inserted into head 18 of a premix torch as described in reference to FIG. 5. Premix heating nozzle 120 is removably held in head 18 by retaining nut 60. In this embodiment, premix heating nozzle 120 includes an adaptor 126 and a heating tip 127, which is threaded onto a discharge end 130 of adaptor 126. Retaining nut 60 forces a conical intake end 122 of adaptor 126 into sealing engagement with the complementary frusto-conical wall 57 of nozzle seat chamber 36 (see FIG. 2). An axial bore 128 communicates with a preheat oxygen bore 132 and preheat bore 134 and extends through adaptor 126 to discharge end 130. The preheat oxygen bore 132 and preheat bore 134 respectively communicate with annular preheat oxygen distribution chamber 101 and annular preheat fuel gas distribution chamber 103 (see also FIG. 3). Thus, preheat oxygen and preheat fuel gas enter premix heating nozzle 120 through first and second bores 132 and 134 respectively and are mixed to a heating gas mixture in axial bore 128 before exiting adaptor 126 at discharge end 130. A tip 135 of conical intake end 122 seals co-axial bore 50 of head 18 to prevent an accidental discharge of cutting oxygen into nozzle seat chamber 36. The heating gas mixture is discharged from axial bore 128 into a radial heating gas distribution chamber 136 which is defined by adaptor 126 and heating tip 127 and communicates with a plurality of axial heating gas bores 138 in heating tip 127. The heating gas mixture finally exits heating tip 126 through a plurality of heating gas discharge openings 140 in a front face 124 of the heating tip. Therefore, a fluid cooled cutting torch in accordance with the invention may be employed as a heating torch when used in combination with premix heating nozzle 120.

The fluid cooled cutting torch of the present invention is more effectively cooled, providing ease of handling the torch and reducing adhesion of molten metal to the torch and a torch nozzle. Furthermore, the torch of the invention may be cost efficiently manufactured, used with a variety of premix and postmix nozzles, and easily converted from a postmix type torch to a premix type torch or a premix heating type torch.

The embodiments of the invention in which an exclusive property or privilege is claimed are defined as follows:

1. A fluid cooled cutting torch for use as a premix cutting torch or a postmix cutting torch, comprising:
 a torch handle having a front end, a rear end and a passageway which extends from the front end to the rear end;
 a torch head having a rear end connected to the front end of the handle and a free end for interchangeably receiving one of a premix torch nozzle and a postmix torch nozzle;
 a torch butt assembly connected to the rear end of the handle;
 a first supply tube for supplying one of preheat gas and preheat oxygen, a second supply tube for supplying one of preheat oxygen and preheat gas and a third supply tube for supplying cutting oxygen, which tubes pierce the torch butt assembly, pass through the passageway to the rear end of the torch head and contact the torch head in a gas impervious relation, for supply preheat gas, preheat oxygen and cutting oxygen to the torch head;
 a cooling fluid supply conduit having an adaptor end for connection to a cooling fluid supply line and a discharge end for discharging cooling fluid into the passageway;
 a cooling fluid drainage conduit having an adaptor end for connection to a cooling fluid drawinage line and an intake end for removing cooling fluid from the passageway in the handle;
 the cooling fluid supply conduit and the cooling fluid drainage conduit respectively piercing the torch butt assembly and the cooling fluid supply conduit extending through the passageway to a point adjacent the torch head so that cooling fluid entering the passageway impinges directly upon the rear end of the torch head;
 the free end of the torch head including a nozzle seat chamber for interchangeably receiving the premix and the postmix cutting torch nozzle, said nozzle seat chamber including a first and a second radial gas distribution groove, which grooves are in respective fluid communication with aid first and second supply tubes, and the grooves distribute preheat gas and preheat oxygen to a nozzle in the nozzle seat chamber, the nozzle seat chamber further including an axial bore in fluid communication with the third supply tue for supplying cutting oxygen to aid nozzle; and
 when a premix nozzle is in the nozzle seat chamber, a preheat oxygen supply line is connected to the first supply tube and a fuel gas supply line is connected to the second supply tube, whereas when a postmix nozzle is in the nozzle seat chamber a preheat gas supply line is connected to the first supply tube and a preheat oxygen supply line is connected to the second supply tube.

2. A fluid cooled postmix cutting torch, comprising:
 a torch handle having a front end, a rear end and a passageway which extends from the front end to the rear end;
 a torch head having a rear end connected to the front end of the handle and a free end for receiving a premix torch nozzle and a postmix torch nozzle;
 a torch butt assembly connected to the rear end of the handle;
 a first supply tube for supplying a preheat gas, a second supply tube for supplying preheat oxygen and a third supply tube for supplying cutting oxygen, which supply tubes pierce the torch butt assembly, pass through the passageway to the torch head and contact the torch head in a gas impervious relation for supplying preheat gas, preheat oxygen and cutting oxygen to the torch head;
 a cooling fluid supply conduit having an adaptor end for connection to a cooling fluid supply line and a discharge end for discharging cooling fluid into the passageway;
 a cooling fluid drainage conduit having an adaptor end for connection to a cooling fluid drainage line and an intake end for removing cooling fluid from the passageway in the torch handle;
 the cooling fluid supply conduit and the cooling fluid drainage conduit respectively piercing the torch butt assembly and the cooling fluid supply conduit extending through the passageway to a point adjacent the torch head so that cooling fluid entering the passageway impinges directly upon the rear end of the torch head; and
 the torch head includes a nozzle seat chamber for receiving the postmix cutting torch nozzle, said nozzle seat chamber including a first radial gas distribution groove in fluid communication with the first supply tube to distribute preheat oxygen to the postmix nozzle, and a second radial gas distribution groove in fluid communication with the second supply tube to distribute the preheat gas to the postmix nozzle, said nozzle chamber further including an axial bore in fluid communication with the third supply tube to supply cutting oxygen to the postmix nozzle.

3. A fluid cooled premix cutting torch, comprising: a torch handle having a front end, a rear end and a passageway which extends from the front end to the rear end;

a torch head having a rear end connected to the front end of the handle and a free end for receiving a premix torch nozzle;

a torch butt assembly connected to the rear end of the handle;

a first supply tube for supplying a preheat gas, a second supply tube for supplying preheat oxygen and a third supply tube for supplying cutting oxygen, which supply tubes pierce the torch butt assembly, pass through the passageway to the torch head and contact the torch head in a gas impervious relation or supplying preheat gas, preheat oxygen and cutting oxygen to the torch head;

a cooling fluid supply conduit having an adaptor end for connection to a cooling fluid supply line and a discharge end for discharging cooling fluid into the passageway;

a cooling fluid drainage conduit having an adaptor end for connection to a cooling fluid drainage line and an intake end for removing cooling fluid from the passageway in the handle;

the cooling fluid supply conduit and the cooling fluid drainage conduit respectively piercing the torch butt assembly and the cooling fluid supply conduit extending through the passageway to a point adjacent the torch head so that cooling fluid entering the passageway impinges directly upon the rear end of the torch head; and the torch head includes a nozzle seat chamber for receiving the premix cutting torch nozzle, said nozzle seat chamber including a first radial gas distribution groove in fluid communication with the first supply tube to distribute preheat oxygen to the premix nozzle, and a second radial gas distribution groove in fluid communication with the second supply tube to distribute the preheat gas to the premix nozzle, said nozzle seat chamber further including an axial bore in fluid communication with the third supply tube to supply cutting oxygen to the premix nozzle.

4. A fluid cooled cutting torch as defined in claims 1, 2 or 3, wherein said supply tubes and supply conduits extend in said passageway without contacting any part of the torch handle.

5. A fluid cooled cutting torch as defined in claims 1, 2 or 3 wherein said torch head and said torch butt assembly are rigidly affixed to the torch handle by soldering.

6. A fluid cooled cutting torch as defined in claims 1, 2 or 3 wherein said cooling fluid supply conduit discharge end is cut obliquely for increasing the discharge angle of the cooling fluid exiting the discharge end.

7. A fluid cooled cutting torch as defined in claim 1, 2 or 3 wherein the nozzle seat chamber alternatively accepts a premix heating nozzle, which premix heating nozzle includes an intake end and a discharge end, a tip of the intake end sealingly contacting said axial bore when said premix heating nozzle is in the nozzle seat chamber to prevent a discharge of cutting oxygen from the axial bore into the nozzle seat chamber, and the premix heating nozzle further includes a plurality of gas discharge bores in the discharge end which communicate with a heating gas distribution chamber, which chamber is supplied with preheat oxygen and fuel gas by bores in the heating nozzle which respectively communicate with the first and second radial gas distribution groovess in the torch head.

* * * * *

UNITED STATES PATENT AND TRADEMARK OFFICE
CERTIFICATE OF CORRECTION

PATENT NO. : 5,120,026
DATED : June 9, 1992
INVENTOR(S) : CLAUDE BISSONETTE It is certified that error appears in the above-identified patent and that said Letters Patent is hereby corrected as shown below:

Claim 1, col. 7, line 59, delete "drawinage" and substitute therefor ---drainage---; Claim 1, col. 8, line 6, delete "aid" and substitute therefor ---said---; Claim 1, col. 8, line 11, delete "tue" and substitute therefor ---tube---; Claim 1, col. 8, line 12, delete "aid" and substitute therefor ---said---; Claim 7, col. 10, line 34, delete "groovess" and substitute therefor ---grooves---.

Signed and Sealed this

Twenty-ninth Day of March, 1994

Attest:

BRUCE LEHMAN

Attesting Officer

Commissioner of Patents and Trademarks